Nov. 25, 1930.  G. W. VAN DEREN  1,782,492
UNIVERSAL JOINT
Filed Nov. 1, 1927  2 Sheets-Sheet 1
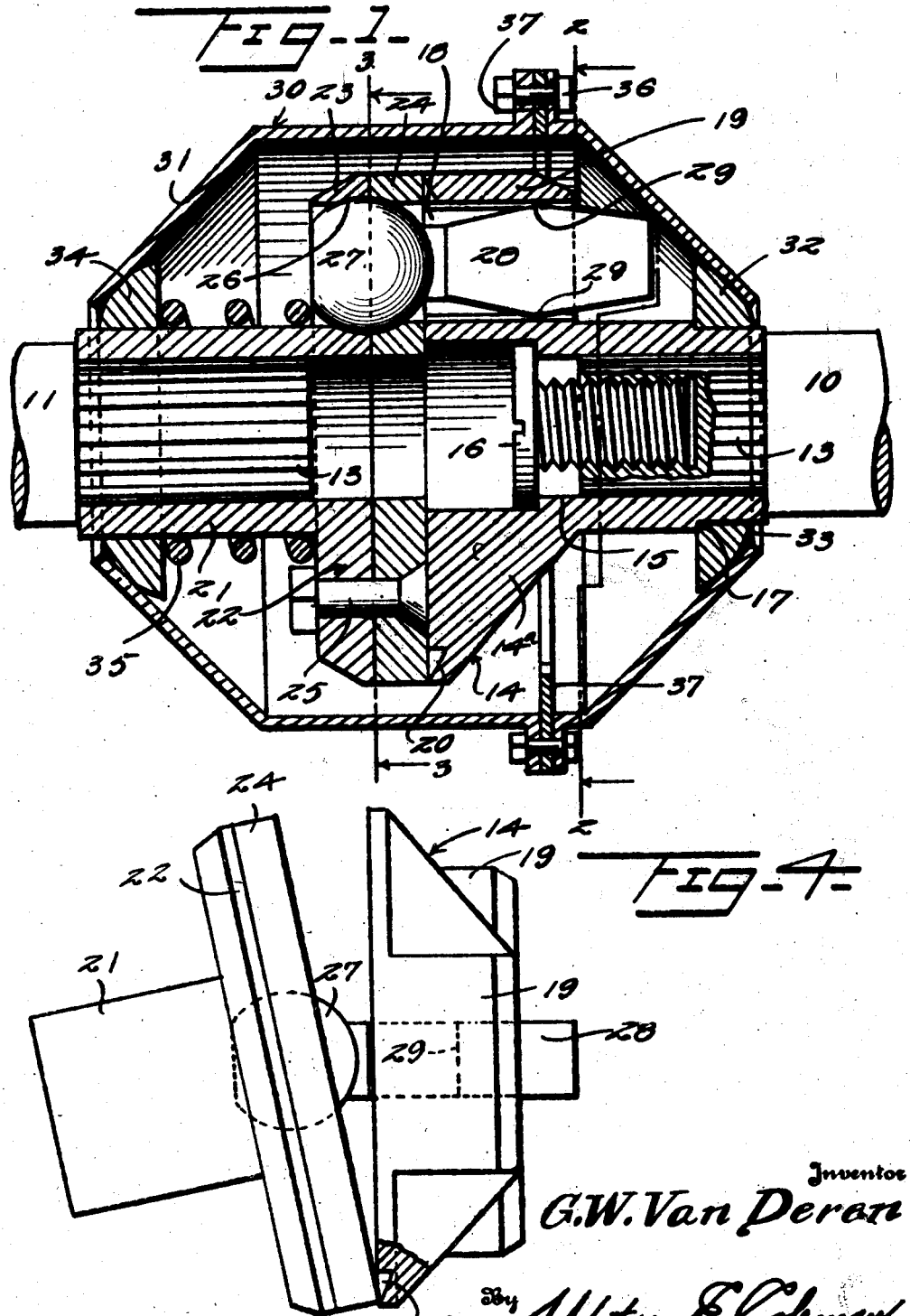

Nov. 25, 1930.  G. W. VAN DEREN  1,782,492
UNIVERSAL JOINT
Filed Nov. 1, 1927  2 Sheets-Sheet 2
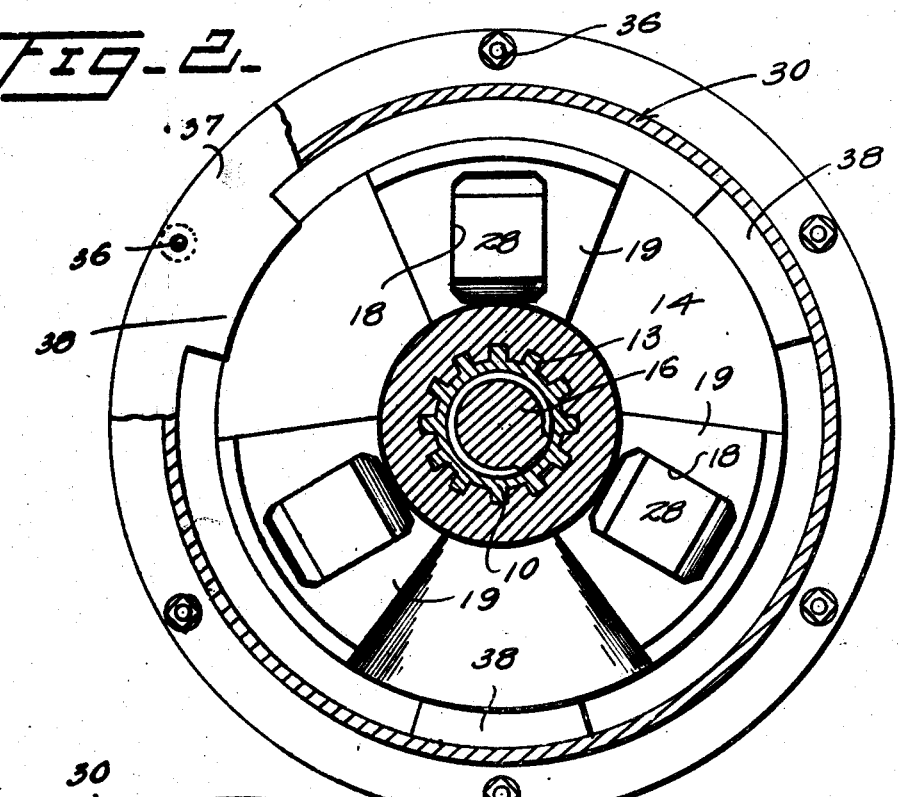
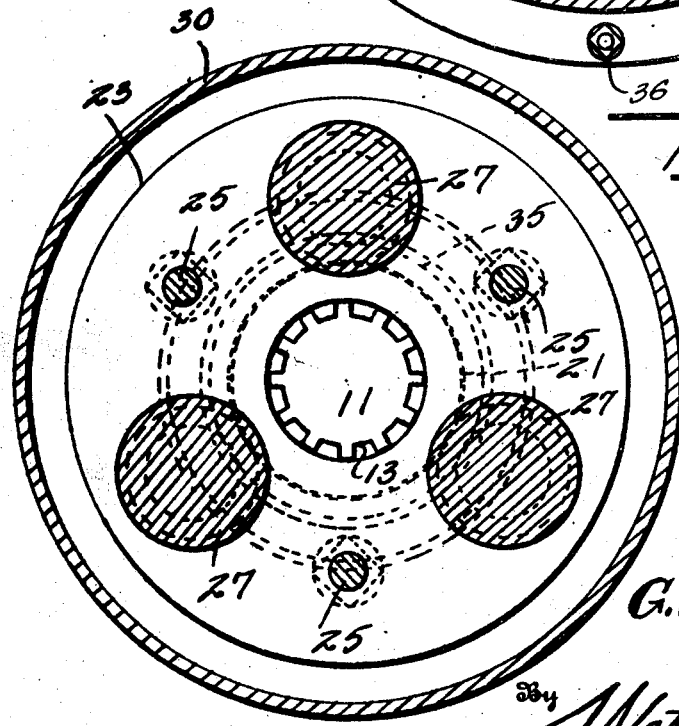
Inventor
G. W. Van Deren
By Watson E. Coleman
Attorney Patented Nov. 25, 1930

1,782,492

UNITED STATES PATENT OFFICE

GEORGE W. VAN DEREN, OF ELMIRA, NEW YORK

UNIVERSAL JOINT

Application filed November 1, 1927. Serial No. 230,344.

This invention relates to universal joints and has for an important object thereof the production of a universal joint which will give a smooth positive drive and which will provide adequate compensation for both angular and longitudinal displacement of the driving and driven elements.

A further object of the invention is to provide means for housing the universal joint whereby an oil tight casing therefor may be very readily provided while still permitting both angular and longitudinal displacement of the driving and driven elements.

A further object of the invention is to provide a device of this character which may be readily and cheaply produced, which will be durable and efficient in service and a general improvement in the art.

These and other objects I attain by the construction shown in the accompanying drawings, wherein for the purpose of illustration is shown a preferred embodiment of my invention and wherein:—

Figure 1 is a vertical sectional view through a universal joint constructed in accordance with my invention;

Figure 2 is a section on the line 2—2 of Figure 1;

Figure 3 is a section on the line 3—3 of Figure 1;

Figure 4 is a side elevation partially diagrammatic showing the positions assumed by the sections of the joint upon angular displacement of the axis thereof.

Referring now more particularly to the drawings, the numerals 10 and 11 indicate shafts to be connected and each having a spline extension 13. The numeral 14 designates a body having an axial bore 15, the outer end of which is formed as a spline for coaction with the spline of the shaft 10. Inwardly of the inner end of the spline, the bore is enlarged for the reception of the head 16 of a cap screw which seats upon the shoulder formed by the enlargement and has its threaded shank engaged in a threaded bore formed in the spline 13 of the shaft 10, so that the shaft 10 and body 14 are held against longitudinal displacement. The body 14 adjacent its outer or shaft engaging end is exteriorly reduced to provide a shoulder 17 for a purpose presently to appear.

The body 14 has at its inner end an enlargement 14ª which is formed with circumferentially spaced openings 18 which parallel the axis of the body and the shaft 10 and are rectangular in cross section. The exterior of the body at the enlargement is formed with circumferentially spaced shoulders 19 through which the outer ends of the openings 18 open and these shoulders perform a function which will hereinafter appear. The inner face of the enlargement is provided adjacent its periphery with a groove 20 which increases in depth toward the center or axis of the body.

Splined to the shaft 11 is a shank 21 circular in cross section and having at its inner end a head 22. The head 22 is formed in two sections 23 and 24, of which the section 23 is integral with the shank 21 and the section 24 is secured to the section 22 by bolts 25.

The sections 23 and 24 at circumferentially spaced points are provided with openings, the inner ends of which combine to provide a socket 26 receiving and fitting the spherical heads 27 of drive connectors, generally designated at 28. The drive connectors 28 each embody a shank having its side faces flat, parallel and spaced apart a distance substantially equal to the space between opposed side faces of the openings 18 of the enlargement 14ª. The inner and outer faces of the shanks are provided centrally with peaks 29 and from these peaks converge toward the end of the shank and the head. The extreme width of the shank at the peaks is slightly less than the depth of the openings 18.

It will be obvious that during rotation of the shafts 10 and 11 without regard to angular displacement of these shafts within reasonable limits, drive will be transmitted to the driving or driven shaft by the members 28, the flat faces of the shanks coacting with the sides of the openings to prevent circumferential displacement of the driving and driven elements. Angular axial displacement will be compensated for by both longitudinal shifting movement and radial oscillation of the shanks in the openings 18, the spherical heads in their engagement with the head of the shank 21 permitting this movement. Due to the engagement of the shanks 28 in the openings 18 and particularly with the side walls thereof, there will be a tendency to maintain longitudinal alignment of the openings of the head 22 and of the enlargement 14ª and through this tendency, the head 22 will partake of actual transverse displacement which will be more obvious from an inspection of Figure 4. At this time, the perimetric edge of the inner face of the head 22 may enter the groove 20 and in so doing, will prevent excessive separation of the upper edges of the head 22 and enlargement 14ª. Due to the large side bearing face provided by the shanks, adequate wearing surface is provided to prevent rapid deterioration of the joint and to prevent looseness and noisy operation thereof.

In order to provide a lubricating housing for the joint and to further provide means for yieldably maintaining the head 22 and enlargement 14ª in engagement with one another, I provide a cylindrical case 30 having conical ends 31. Upon the body 14 at the shoulder 17, I seat the inner face of a gasket element 32, the outer face 33 of which is arcuately curved. Slidable upon the shank 21 is a similar gasket element 34. Between the gasket element 34 and the head 22 and surrounding the shank is a spring 35, the expansion of which tends to force the gasket 34 outwardly, thus moving the case longitudinally and insuring firm contact between the conical wall 31 at the opposite end of the face and the gasket 32 which is immovable in the direction in which the case tends to shift. The tension of this spring will maintain the spring between the case and gasket and will further assist in maintaining the head 22 in proper engagement with the enlargement 14ª of the body 14. While frictional engagement of the ends of the body with these gaskets would, under normal circumstances, provide for rotation of the body with the joint in order to insure against any accidental circumferential displacement, which would tend to cause wear upon the gaskets, and at the same time provide a case construction which may be readily assembled, I form the case in two sections which are bolted together, as at 36. The bolts securing the sections together likewise secure to the face a ring element 37 having at its inner face circumferentially spaced lugs 38 adapted to enter between the lugs 19 to provide a driving connection between the body 14 and the case. Other means might, however, be resorted to to provide this connection.

Since the construction hereinbefore set forth is capable of a certain range of change and modification without materially departing from the spirit of the invention, I do not limit myself to such specific structure except as hereinafter claimed.

I claim:—

1. In a universal joint, a body having means whereby it may be secured to a shaft and having longitudinally extending openings adapted to parallel the axis of the shaft, a head having a shank whereby it may be concentrically secured to a second shaft against rotation with relation thereto and drive connectors having shanks engaged in the openings of the body and spherical heads engaged in sockets in said head, each shank having coaction with the walls of the opening in which it engages permitting oscillation thereof in a plane intersecting the shank and radial to the axis of the body while preventing oscillation thereof at right angles to said plane.

2. In a universal joint, a body having means whereby it may be secured to a shaft and having longitudinally extending openings adapted to parallel the axis of the shaft, a head having a shank whereby it may be concentrically secured to a second shaft against rotation with relation thereto and drive connectors having shanks engaged in the openings of the body and spherical heads engaged in sockets in said head, each shank having coaction with the walls of the opening in which it engages permitting oscillation thereof in a plane intersecting the shank and radial to the axis of the body while preventing oscillation thereof at right angles to said plane, said head and body having flat faces confronting and engaging when the shafts connected therewith are co-axial, the body having a groove in its flat confronting face receiving the perimetric edge of the face of the head when the shafts are disposed at an angle.

3. In a universal joint, a body having means whereby it may be secured to a shaft and having longitudinally extending openings adapted to parallel the axis of the shaft, a head having a shank whereby it may be concentrically secured to a second shaft against rotation with relation thereto, drive connectors having shanks engaged in the openings of the body and spherical heads engaged in sockets in said head, each shank having coaction with the walls of the opening in which it engages permitting oscillation thereof in a plane intersecting the shank and radial to the axis of the body while preventing oscillation thereof at right angles to said plane, and spring means resisting separation of the head and body.

4. A universal joint comprising a body provided with openings arranged parallel to its axis, a head having spherical sockets alined with the openings, and drive connectors having shanks slidably arranged in said openings and having spherical heads rockably arranged in said sockets, said shanks being provided at their inner and outer faces with central peaks and having said faces converging toward the ends of the shanks and the heads, and said peaks and converging faces permitting the shanks to rock on the body in radial planes.

In testimony whereof I hereunto affix my signature.

GEORGE W. VAN DEREN.